(12) United States Patent
Beaudet et al.

(10) Patent No.: US 10,362,895 B2
(45) Date of Patent: *Jul. 30, 2019

(54) DEVICE TO PRODUCE MILK-BASED DRINKS WITH A CONNECTION SYSTEM AND A COFFEE MAKER CONTAINING SUCH A DEVICE

(71) Applicant: SEB S.A., Ecully (FR)

(72) Inventors: Olivier Beaudet, Geneslay (FR); Christian Dupuy, La Bazoge Montpincon (FR); Christophe Guerin, St Christophe du Luat (FR)

(73) Assignee: SEB S.A., Ecully (FR)

( * ) Notice: Subject to any disclaimer, the term of this patent is extended or adjusted under 35 U.S.C. 154(b) by 398 days.

This patent is subject to a terminal disclaimer.

(21) Appl. No.: 14/718,884

(22) Filed: May 21, 2015

(65) Prior Publication Data

US 2015/0335195 A1 Nov. 26, 2015

(30) Foreign Application Priority Data

May 23, 2014 (FR) ...................................... 14 54674

(51) Int. Cl.
*A47J 31/44* (2006.01)

(52) U.S. Cl.
CPC ....... *A47J 31/4489* (2013.01); *A47J 31/4403* (2013.01); *A47J 31/4485* (2013.01)

(58) Field of Classification Search
CPC ................ A47J 31/4489; A47J 31/4403; A47J 31/4485; A47J 31/46; A47J 31/44
USPC ...... 99/453, 323.1, 446, 437, 290, 293, 300, 99/295, 294, 299, 279, 275, 288, 316, 99/323.3, 537; 426/596; 74/125.5, 435, 74/437, 462, 468

See application file for complete search history.

(56) References Cited

U.S. PATENT DOCUMENTS

| | | | | | |
|---|---|---|---|---|---|
| 4,345,516 | A | * | 8/1982 | Sinclair | A47J 37/108 249/115 |
| 4,825,505 | A | * | 5/1989 | Witte | A47J 45/072 16/425 |
| 4,852,474 | A | * | 8/1989 | Mahlich | A47J 31/4489 261/121.1 |
| 5,265,519 | A | * | 11/1993 | Schiettecatte | A47J 31/4485 261/78.1 |
| 5,473,972 | A | * | 12/1995 | Rizzuto | A47J 31/4403 99/290 |

(Continued)

FOREIGN PATENT DOCUMENTS

| | | |
|---|---|---|
| EP | 2047779 A1 | 4/2009 |
| EP | 2606783 A1 | 6/2013 |

(Continued)

*Primary Examiner* — Jimmy Chou
(74) *Attorney, Agent, or Firm* — The Webb Law Firm (57) ABSTRACT

Provided is a milk-based drink production device designed to work with a steam output nozzle tip of a coffee maker, where the device contains a steam input conduit. The device contains a connection system to the steam output nozzle tip which includes at least one mobile jaw that shifts between a connected position, in which a watertight connection is formed between the steam output nozzle tip and the steam input conduit and in which the device cannot be separated from the steam output nozzle tip, and a disconnected position in which the device may be separated from the steam output nozzle tip.

12 Claims, 6 Drawing Sheets

(56) References Cited

U.S. PATENT DOCUMENTS

| | | | | |
|---|---|---|---|---|
| 5,862,740 | A * | 1/1999 | Grossi | A47J 31/4485 261/DIG. 16 |
| 5,931,080 | A * | 8/1999 | Roure Boada | A47J 31/4482 261/DIG. 76 |
| 6,192,785 | B1 * | 2/2001 | Trida | A47J 31/41 99/275 |
| 7,565,745 | B2 * | 7/2009 | Von Schoultz | A47J 43/26 30/120.2 |
| 8,505,788 | B2 * | 8/2013 | Thibault | B44D 3/14 16/425 |
| 8,695,490 | B2 * | 4/2014 | Harris | A47J 43/1031 99/537 |
| 9,380,908 | B2 * | 7/2016 | Aeberhard | |
| 2007/0243305 | A1 * | 10/2007 | Marconi | A47J 31/4485 426/596 |
| 2008/0188365 | A1 * | 8/2008 | Dalla Piazza | A47J 43/24 494/84 |
| 2011/0100230 | A1 * | 5/2011 | Cheng | A47J 31/4485 99/293 |
| 2012/0297989 | A1 * | 11/2012 | Tonelli | A47J 31/4485 99/293 |
| 2013/0019903 | A1 * | 1/2013 | Rizzuto | A47J 31/46 134/22.15 |
| 2016/0106257 | A1 * | 4/2016 | Ferraro | A47J 31/4403 99/293 |
| 2016/0113436 | A1 * | 4/2016 | Noordhuis | A47J 31/4489 99/293 |

FOREIGN PATENT DOCUMENTS

| | | | | |
|---|---|---|---|---|
| WO | 2011064702 | A1 | 6/2011 | |
| WO | WO 2013056871 | A1 * | 4/2013 | A47J 31/4485 |

* cited by examiner

DEVICE TO PRODUCE MILK-BASED DRINKS WITH A CONNECTION SYSTEM AND A COFFEE MAKER CONTAINING SUCH A DEVICE

CROSS-REFERENCE TO RELATED APPLICATIONS

This application claims priority to French Patent Application No. 1454674 filed May 23, 2014, the disclosure of which is hereby incorporated in its entirety by reference.

FIELD OF THE INVENTION

This invention falls into the general technical field of milk-based drink-production equipment, in particular, of coffee makers with a steam output nozzle tip and devices designed to work with a steam output nozzle tip to produce milk-based drinks, in particular, hot and frothed milk.

DESCRIPTION OF RELATED ART

Known art is document U.S. Pat. No. 5,473,972 to create a milk-based drink production device, in particular, frothed milk, designed to work with a steam output nozzle tip of a coffee maker, where the steam output nozzle tip is positioned horizontally. The device contains a steam input conduit with a receptacle at one end. The device is connected to the machine by inserting the steam output nozzle tip into the receptacle in a horizontal direction to create a watertight connection between the steam output nozzle tip and the steam input conduit. The position of the device on the machine is maintained solely by friction between a cylindrical section of the receptacle and an O-ring positioned on an external section of the steam output nozzle tip. Accordingly, if the user positions the device on the machine incorrectly, in particular, by not sufficiently inserting the receptacle over the steam output nozzle tip, steam may leak or, in an extreme situation, a steam jet could even injure the user.

One solution to this problem consists of equipping the coffee maker with a system to detect whether the device is present. However, the installation of such a system requires major and expensive modifications to the machine.

One objective of this invention is to offer a milk-based drink production device and a coffeemaker that uses this device, which is easy to use, ergonomic and which operates safely.

Another objective of this invention is to offer a milk-based drink production device and a coffee maker which uses this device, which has a simple design and inexpensive to implement.

SUMMARY OF THE INVENTION

These objectives are achieved with a milk-based drink production device designed to work with a steam output nozzle tip of a coffee maker where the device contains a steam input conduit characterized by the fact that the device contains a system to connect to the steam output nozzle tip consisting of at least one jaw that can shift between a connected position in which a watertight connection is formed between the steam output nozzle tip and the steam input conduits in which the device cannot be separated from the steam output nozzle tip, and a disconnected position in which the device may be separated from the steam output nozzle tip.

Accordingly, in the connected position, the mobile jaw of the steam output nozzle tip connection system ensures a secure, watertight connection between the steam output nozzle tip and the steam input conduit.

Further, the milk-based drink production device contains a system to connect the steam output nozzle tip to a coffee maker. Accordingly, a coffee maker which works with this device could be a standard coffee maker equipped with a frothing nozzle positioned in a removable fashion on the steam exit nozzle. The steam output nozzle tip is compatible or made easily compatible with the device, without requiring changes to the coffee maker control system.

Advantageously, the connection system contains a fixed jaw.

This arrangement creates a connection system which is simple and inexpensive to implement. Further, the fixed jaw may include a system to guide the steam output nozzle tip into the steam input conduit when connecting.

Advantageously, the mobile jaw can be moved laterally.

Moving the mobile jaw laterally ensures that the watertight connection between the steam output nozzle tip and the steam input conduit remains secure.

Preferably, the mobile jaw is formed by a receptacle positioned at one end of the steam input conduit and is designed to work with an extremity of the steam output nozzle tip.

This arrangement provides for a simple and economic design of the connection system. Further, the connection formed by the receptacle, in particular, by surrounding the extremity of the steam output nozzle tip, may easily be made watertight.

Advantageously, the connection system contains a means to manipulate the mobile jaw.

Accordingly, the mobile jaw may be displaced between connected and disconnected positions and vice versa using any manual or automatic means of manipulation.

Preferably, the means of manipulation will include a lever to move the mobile jaw.

This arrangement allows the mobile jaw movement mechanism to be used with little motion.

Advantageously, the milk-based drink production device contains a bottom on which it rests and the force applied to the lever to shift the mobile jaw between disconnected and connected positions traverses the bottom.

This arrangement allows the device to remain stable when the steam output nozzle tip and the steam input conduit are connected.

Preferably, the device contains a reservoir for milk and a cover, with the connection system located on the cover.

This arrangement allows the connection system, in particular, the means of manipulation, to be positioned on the upper section of the device, thereby making the movement mechanism easily accessible to the user.

Advantageously, the lever is located on the upper face of the cover and the lever moves between an opened position in which the mobile jaw is in the disconnected position, and a folded position on the cover in which the mobile jaw is in connected position.

This arrangement provides for a lever which is very easily accessible to the user. Further, the lever's position is easily visible and allows the user to easily identify whether the connection has been made.

Preferably, the connection system contains a conical housing to guide the steam output nozzle tip into the mobile jaw while making the connection.

This arrangement provides for a device which provides a more ergonomic connection.

The invention also covers a coffee maker with a milk-based drink production device as previously described.

Advantageously, the steam output nozzle tip is bent down.

Accordingly, in the event of improper operation, in particular, a steam output command when the device is not properly positioned, the steam jet is directed downward and not toward the user. Accordingly, this arrangement provides for safer operation, even when operated improperly.

Preferably, the milk-based drink production device is moved in a horizontal fashion toward the coffee maker to position the steam output nozzle tip between the fixed jaw and the mobile jaw.

This arrangement allows simple and ergonomic movement to connect the device to the coffee maker.

Advantageously, the steam output nozzle tip contains a watertight connector to create a watertight connection between the steam output nozzle tip and the steam input conduit.

This arrangement creates a very simple and very economic watertight connection between the steam output nozzle tip and the steam input conduit.

BRIEF DESCRIPTION OF THE DRAWINGS

The invention will be better understood by reviewing various embodiments, which are not in any manner limitative, and which are illustrated in the attached figures in which.

DETAILED DESCRIPTION OF THE INVENTION

Figure 1:
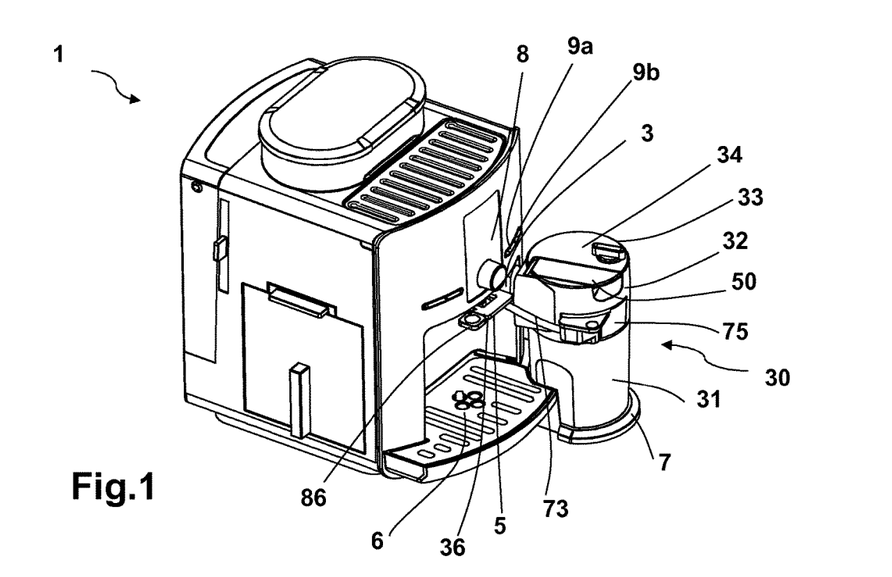
FIG. 1 shows a side view of a milk-based drink production device working with a steam output nozzle tip of a coffee maker in accordance with one particular embodiment of the invention.
Figure 3:
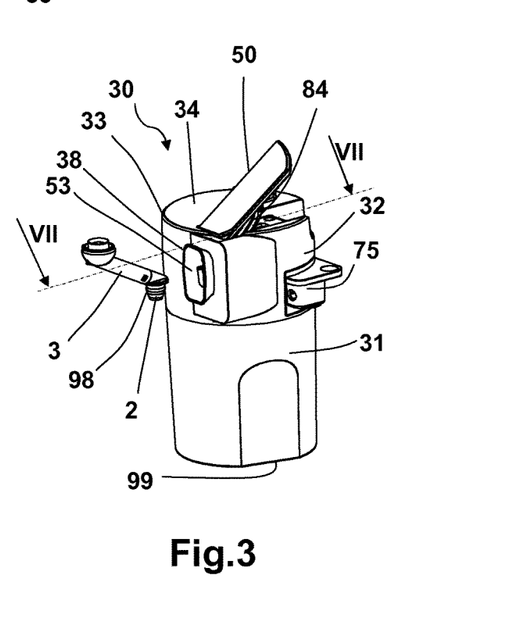
FIG. 3 shows a side view of the milk-based drink production device shown in FIG. 1, with the device and the steam output nozzle tip in a disconnected position.

In the embodiment shown in FIG. 1, milk-based drink production device 30 is connected to steam output nozzle tip 2 of coffee maker 1. Coffee maker 1 contains a boiler (not shown on the diagrams) which produces hot water and/or steam to supply steam output nozzle tip 2. Coffee maker 1 contains articulated steam conduit 3 (FIG. 3) which extends to the outside of coffee maker 1 and ends at steam output nozzle tip 2. Steam output nozzle tip 2 is positioned vertically so that the steam jet is directed downward. Coffee maker 1 contains an infusion chamber (not shown on the diagrams) which is fed hot water to prepare coffee which is distributed through coffee output nozzle 5 positioned above cup rest 6 which can hold a receptacle (not shown on the diagrams).

Coffee maker 1 can simply be a coffee maker with a frothing nozzle and removable milk heating mechanism as described in patent filing EP2606783. The frothing nozzle and heating mechanism can be disconnected from steam output nozzle tip 2 and milk-based drink production device 30, which produces, in particular, hot and frothed milk, is connected in place of steam output nozzle tip 2. Device 30 contains hot and frothed milk distribution conduit 73 including free extremity 36. Extremity 36, through which the hot and frothed milk flows, is positioned near coffee output nozzle 5 so that it can be disconnected to make, in particular, cappuccino. Coffee maker 1 may include stand 7 for device 30 positioned to the side of cup rest 6. Coffee maker 1 contains control panel 8 with, in particular, control button 9a for a steam production cycle. Control panel 8 may include control button 9b to dispense cappuccino, which triggers a hot milk frothed distribution cycle and a distribution cycle for coffee.

Figures 4, 5:
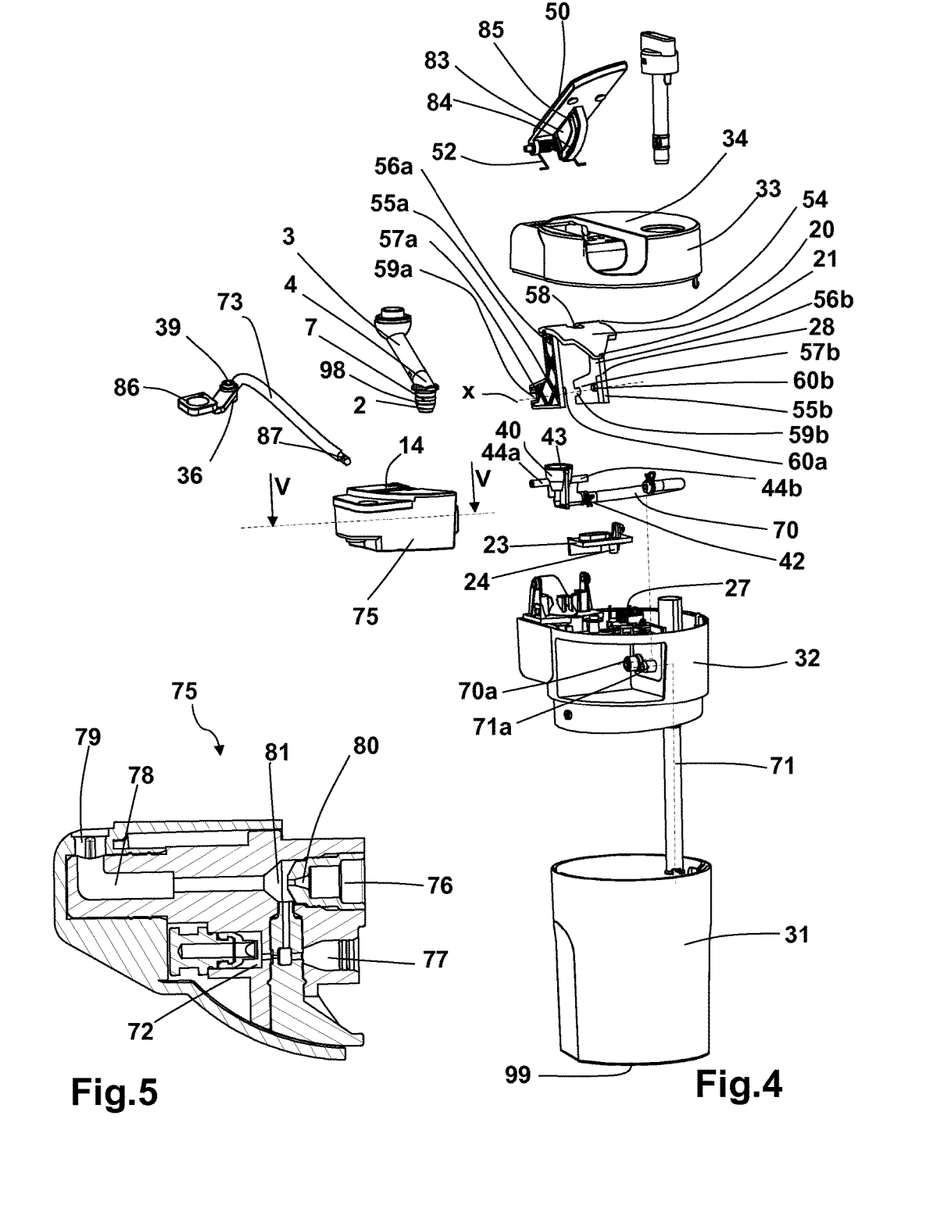
FIG. 4 shows an exploded side view of the milk-based drink production device and the steam output nozzle tip shown in FIG. 1.
FIG. 5 shows a cross-section along line V of the frothing system of the milk-based drink production device shown in FIG. 4.

In FIGS. 4 and 5, device 30 contains reservoir 31 for milk and frothing system 75. Frothing system 75 is in the form of a removable cassette in device 30 to facilitate cleaning. Device 30 contains cover 32 on reservoir 31. Frothing system 75 is positioned on cover 32 to be removable. Device 30 contains steam input conduit 70, milk conduit 71, air conduit 72 and hot and frothed milk distribution conduit 73. Steam input conduit 70 has extremity 70a which is connected to frothing system 75 through input chamber 76. Input chamber 76 includes converging section 80 to create a Venturi effect when steam is injected, i.e., to create a depression in cavity 81 located above converging section 80. Milk conduit 71 contains extremity 71a that is connected to frothing system 75 through input chamber 77 linked to cavity 81. Frothing system 75 contains air conduit 72 which connects outside air to cavity 81. The depression created in cavity 81 allows aspiration to take place in this cavity 81 as the milk and air are mixed with steam to create frothed milk. Frothed milk distribution conduit 73 is connected to frothing system 75 through output chamber 78 linked to cavity 81.

As shown in FIGS. 4 to 8, milk-based drink production device 30 contains a system with fixed jaw 46 and mobile jaw 40 to connect to steam output nozzle tip 2. Jaw 40 moves between a connected position in which a watertight connection is formed between steam output nozzle tip 2 and steam input conduit 70 and in which device 30 cannot be separated from steam output nozzle tip 2, and a disconnected position in which device 30 may be separated from steam output nozzle tip 2. Mobile jaw 40 is formed by receptacle 41, which consists of lateral conduit 42 to steam input conduit 70. Accordingly, mobile jaw 40 forms an extremity of steam input conduit 70. To allow jaw 40 to move, steam input conduit 70 is made at least partially of a flexible material. Receptacle 41 is generally conical in shape reflecting the external shape of steam output nozzle tip 2. Receptacle 41 contains upper opening 43 in which steam output nozzle tip 2 is inserted when making the connection.

Figure 7:
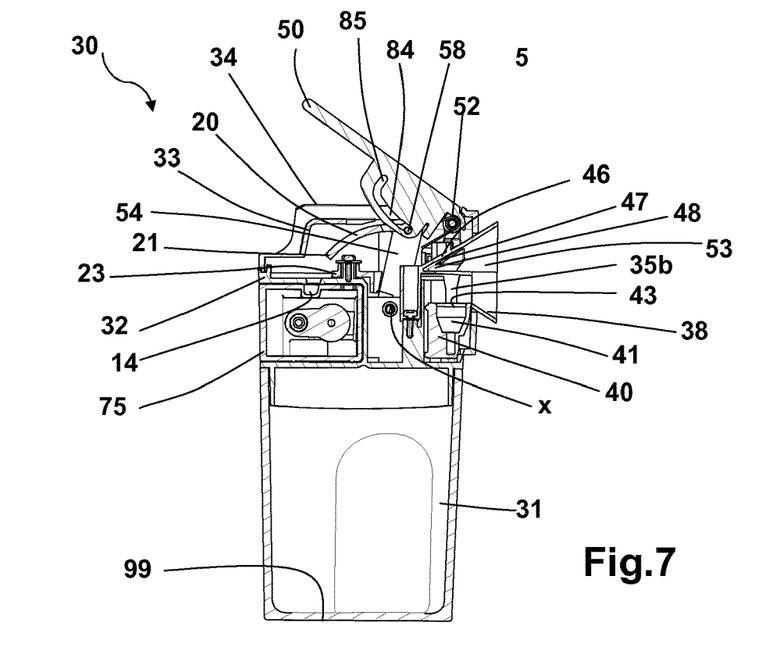
FIG. 7 shows a cross-section along line VII of the milk-based drink production device shown in FIG. 3.

Mobile jaw 40 is located on cover 32 and moves vertically against fixed jaw 46 when making the connection. Mobile jaw 40 contains two lateral trunnions 44a and 44b which match two slits 35a (not shown on the diagrams) and 35b located on cover 32. Fixed jaw 46 is positioned on cover 32, above mobile jaw 40, and includes partition 47 which creates input housing 48 of upper face 4 of steam output nozzle tip 2 (FIG. 7).

Cover 32 contains truncated cone-shaped partition 38 which extends radially to the exterior and forms input housing 53 to guide steam output nozzle tip 2 above mobile jaw 40 when making the connection.

Figure 2:
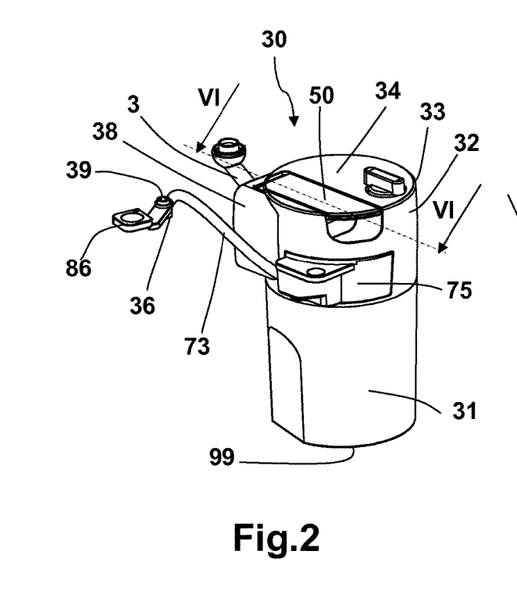
FIG. 2 shows a side view of the milk-based drink production device working with the steam output nozzle tip in a connected position, shown in FIG. 1.
Figure 6:
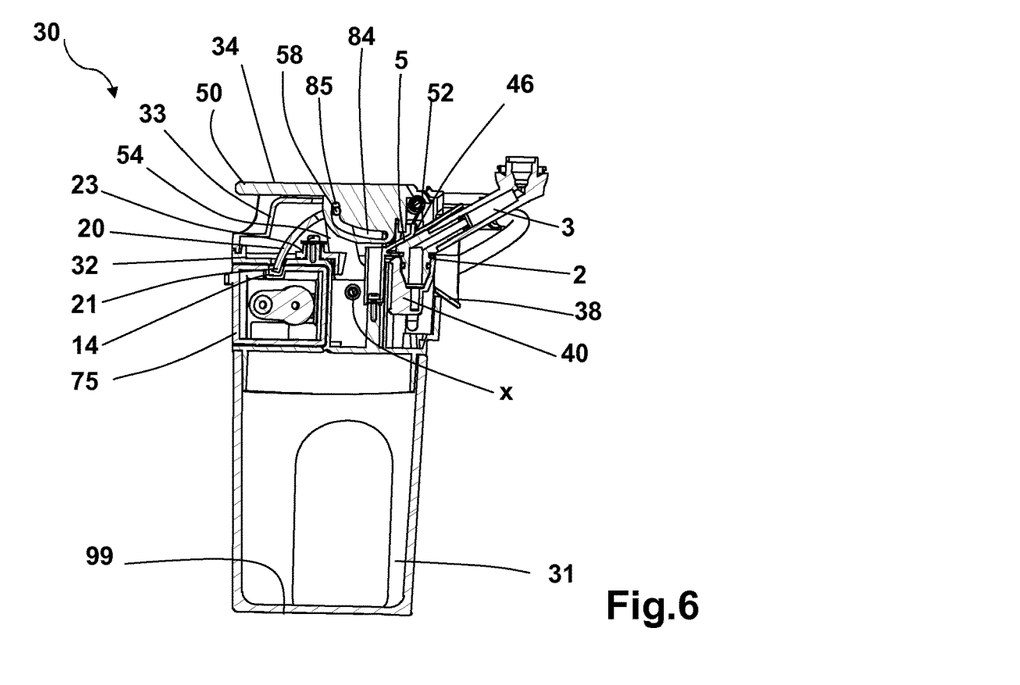
FIG. 6 shows a cross-section along line VI of the milk-based drink production device and the steam output nozzle tip shown in FIG. 2.

The connection system contains manipulation lever 50 of mobile jaw 40. Cover 32 contains upper hood 33 which creates upper face 34 of cover 32 on which lever 50 is located. Lever 50 moves between an opened position above upper face 34 in which mobile jaw 40 is in a disconnected position (FIGS. 3 and 7) and a folded position on upper face 34 in which mobile jaw 40 is in a connected position (FIGS. 2 and 6). Lever 50 contains lower rib 83 including cam track 84.

The connection system contains transfer piece 54 to move lever 50 toward mobile jaw 40. Transfer piece 54 contains two L-shaped, parallel, lateral partitions 55a and 55b. Therefore, each lateral partition 55a and 55b contains large branch 56a and 56b and small branch 57a and 57b all interconnected at the base of the L. At the base of the L, transfer piece 54 has two trunnions 60a and 60b. Accordingly, the transfer piece is mounted to rotate on cover 32 around an axis x traversing trunnions 60a and 60b. Large branches 56a and 56b are interconnected at their extremities by rod 58. At their extremities, small branches 57a and 57b have elongated, oblong housings 59a and 59b. Rod 58 works with cam track 84 of lever 50 and housings 59a and 59b which match trunnions 44a and 44b of mobile jaw 40. Cam track 84 contains extremity section 85 which is almost vertical when lever 50 is in a folded position and which forms an inflexion point in cam track 84's profile. Lever 50 is held in an opened position by recall spring 52.

Figure 9:
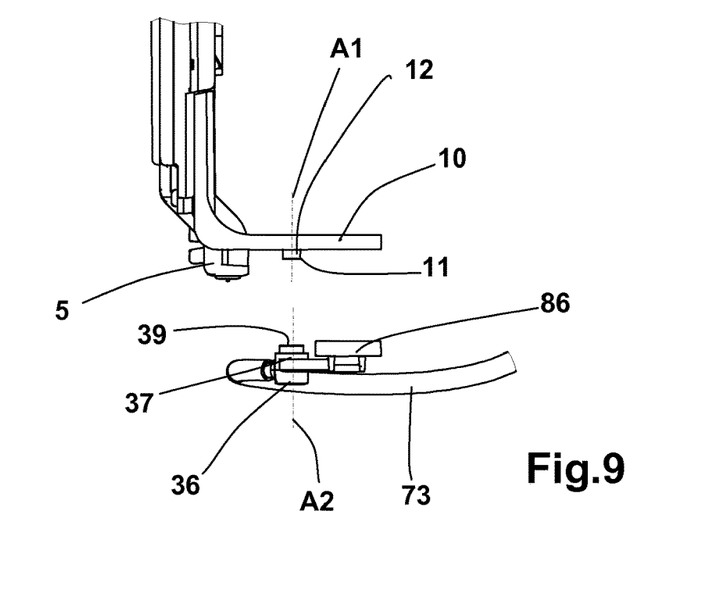
FIG. 9 shows an exploded, detailed view of the nozzle of the coffee output and the extremity of the distribution conduit of the milk-based drink production device and the coffee maker shown in FIG. 1.

In FIG. 9, coffee output nozzle 5 contains grip tab 10 which extends horizontally to the exterior of the coffee maker. Grip tab 10 includes protuberance 11, which is basically cylindrical along axis A1, and which extends downward. Protuberance 11 includes magnetic part 12 which could be made of, for instance, ferromagnetic steel.

Extremity 36 of distribution conduit 73 contains magnet 37 positioned under input housing 39. Input housing 39 is cylindrical along axis A2, which complements the shape of protuberance 11 with which it is designed to work to attach extremity 36 to coffee output nozzle 5. Extremity 36 of distribution conduit 73 contains gripping handle 86, which extends perpendicularly along axis A2 of input housing 39.

Figure 10:
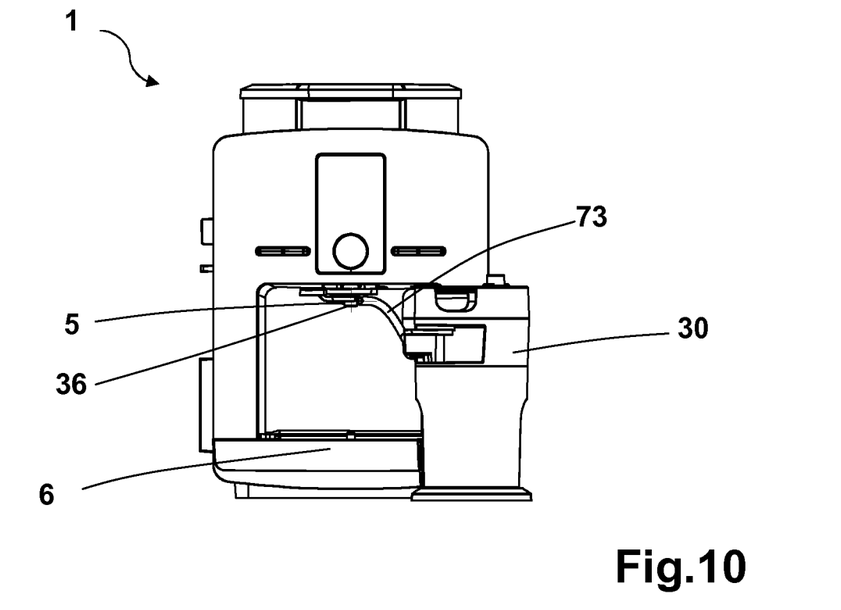
FIG. 10 shows a frontal view of the milk-based drink production device working with the coffee maker shown in FIG. 1, the coffee output nozzle as well as the extremity of the distribution conduit in a raised position.
Figure 11:
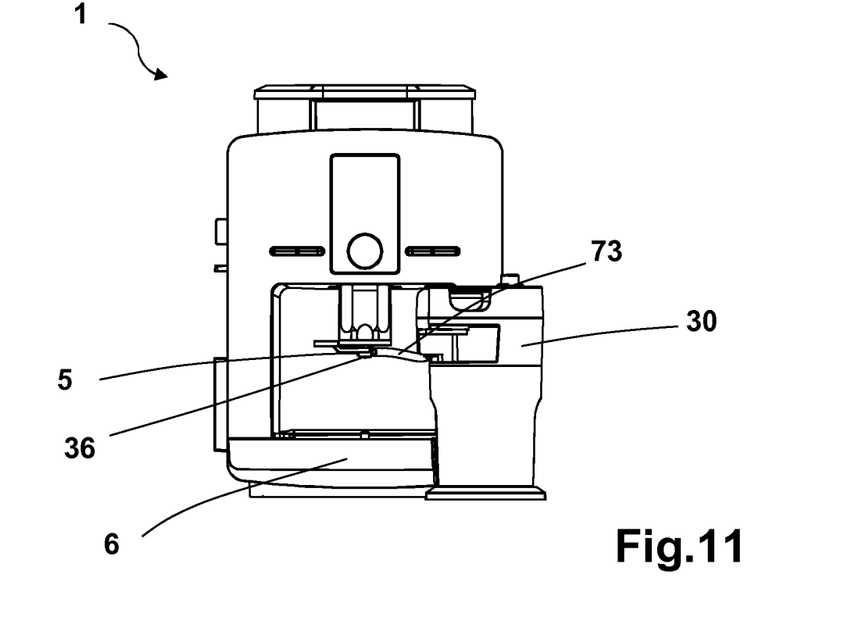
FIG. 11 shows a frontal view of the milk-based drink production device working with the coffee maker shown in FIG. 1, where the coffee output nozzle and the extremity of the distribution conduit are in a lowered position.

As shown in FIGS. 10 and 11, extremity 36 of distribution conduit 73 is positioned on coffee output nozzle 5. Coffee output nozzle 5 shifts between a raised position (FIG. 10) in which a large receptacle may be placed on cup rest 6 and a lowered position (FIG. 11) in which a small receptacle may be placed on cup rest 6. The center of distribution conduit 73 consists of a flexible silicone tube.

In FIGS. 4 and 5, distribution conduit 73 contains cylindrical nozzle 87. Nozzle 87 is designed to work with extremity 79 (FIG. 5) of output chamber 78 of frothing system 75. Extremity 79 is shaped to complement the cylindrical shape of nozzle 87 and has a flexible coating to connect, in a watertight manner, or separate, distribution conduct 73 to, or from, frothing system 75.

As shown in FIGS. 4 to 7, 12 and 13, transfer piece 54 of the connection system contains partition 20 in the shape of an arc of a circle. Partition 20 contains a trapezoidal extremity which forms bolt 21. Bolt 21 moves between a position to secure (FIGS. 6 and 12) frothing system 75 when the connection system is in the connected position and a position (FIGS. 7 and 13) to release the frothing system when the connection system is disconnected.

Figure 12:
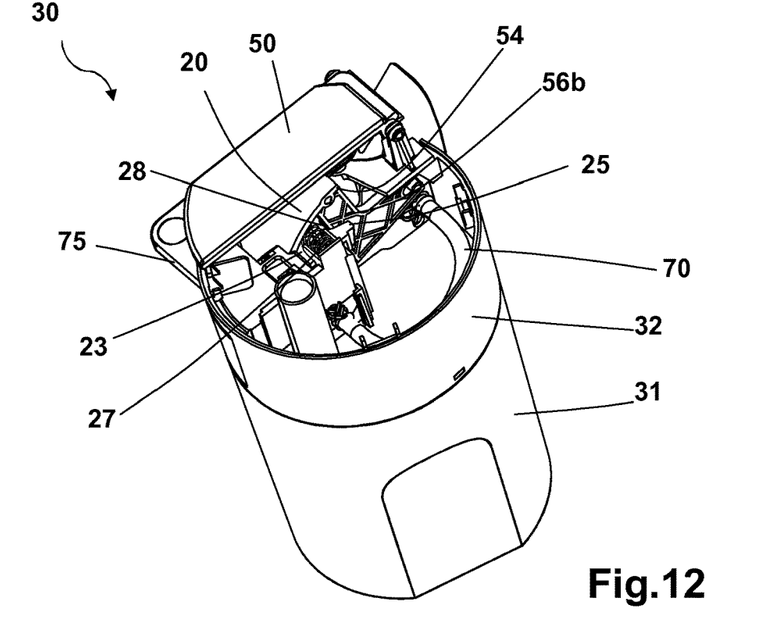
FIG. 12 shows a cutaway side view of the milk-based drink production device shown in FIG. 1, with the frothing system attached and the connection system in the connected position.
Figure 13:
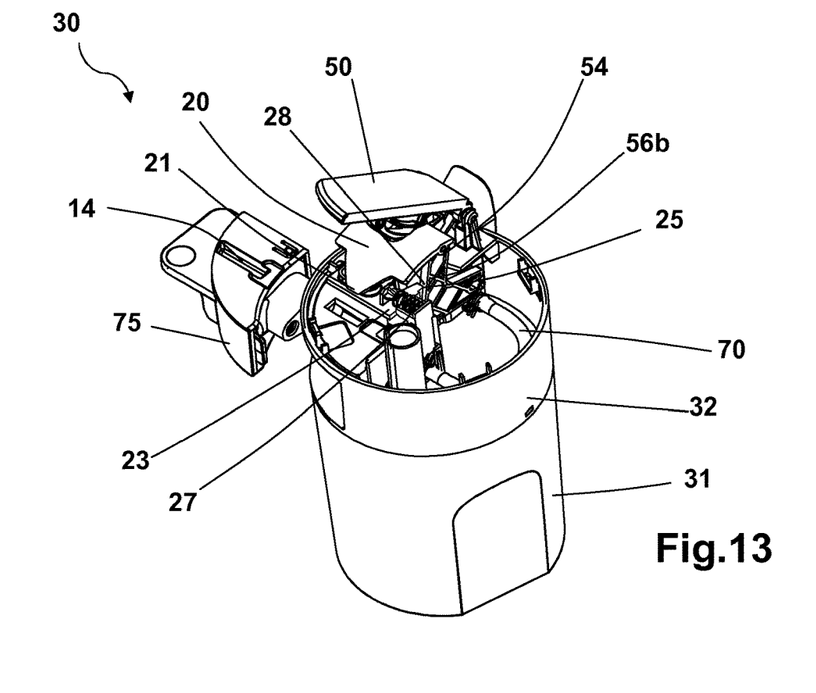
FIG. 13 shows a cutaway side view of the milk-based drink production device shown in FIG. 1, with the frothing system removed and the connection system in the disconnected position.

Frothing system 75 can be shifted on cover 32 between an installed position (FIG. 12) and a removed position (FIG. 13). It is shifted from the removed position to the installed position by a horizontal movement. The frothing system contains cavity 14. Bolt 21 in the secured position is located in cavity 14 to prevent frothing system 75 from being removed. Bolt 21 in the released position is located outside cavity 14 to allow frothing system 75 to be removed.

In FIGS. 4 to 8, 12 and 13, device 30 contains a stop 23 positioned on cover 32 to slide back and forth between a blocked position and a released position. Stop 23 contains outgrowth 24 (FIG. 4) which works with frothing system 75 to allow stop 23 to move between the locked and released positions when frothing system 75 is shifted from the removed to the installed position. Stop 23 is controlled by recall spring 27 to move stop 23 from the released position to the locked position.

Figure 8:
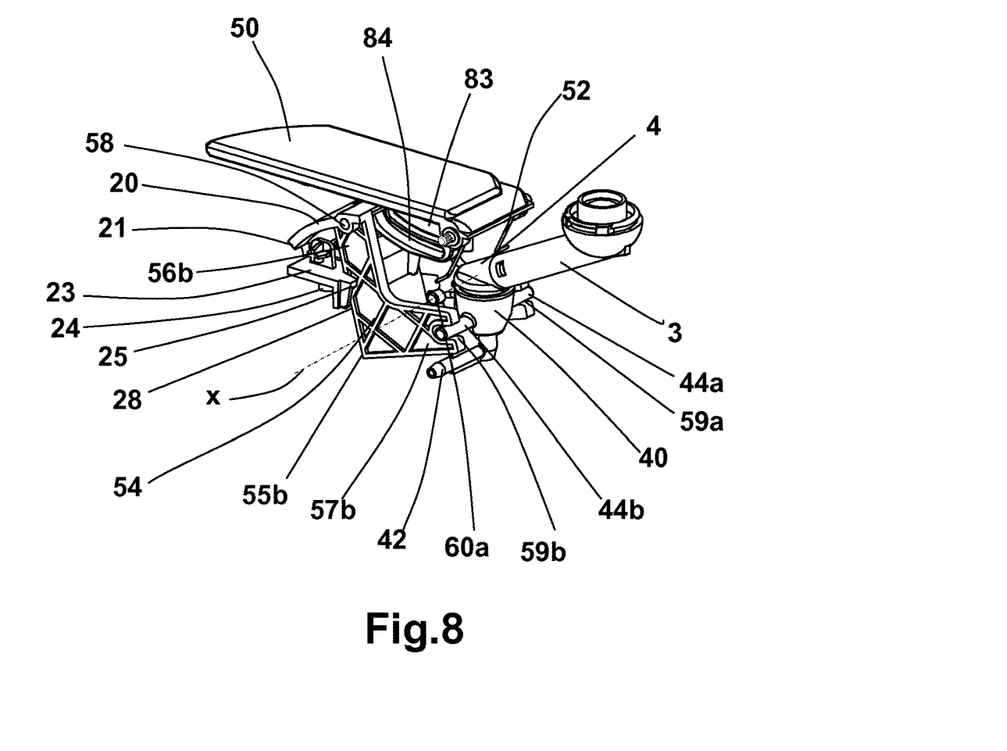
FIG. 8 shows a side view of the means of manipulating the mobile jaw of the milk-based drink production device and the steam output nozzle tip shown in FIG. 1.

Stop 23 contains boss 25 which extends to transfer piece 54, more specifically to face 28 of large branch 57b. When the connection system is in the disconnected position and frothing system 75 is in the removed position, stop 23 is in the locked position in which boss 25 is positioned on face 28 (FIG. 13). Accordingly, transfer piece 54 cannot pivot and the connection system is immobilized. If frothing system 75 is installed, frothing system 75 works with outgrowth 24 to allow stop 23 to move to a released position in which boss 25 is disconnected from face 28 (FIGS. 8 and 12). Accordingly, transfer piece 54 may pivot and the connection system is released.

Referring to FIGS. 1-4 and 6-7, the milk-based drink production device 30 also contains a bottom 99 on which it rests. Further, the force applied to the lever 50 to shift the mobile jaw 40 between disconnected and connected positions traverses the bottom 99.

In operation, the user pours milk into reservoir 31 and positions cover 32 over reservoir 31. He lifts lever 50 and in doing so, cam track 84 acts on rod 58 of transfer piece 54 to pivot it. Pivoting transfer piece 54 causes housings 59a and 59b to pivot, which moves trunnions 44a and 44b and mobile jaw 40 lower, away from fixed jaw 46 to create a space to accept steam output nozzle tip 2 (FIG. 7).

Moving device 30 generally horizontally toward coffee maker 1, the user positions fixed jaw 46 on upper face 4 of steam output nozzle tip 2 and mobile jaw 40 under steam output nozzle tip 2 and places device 30 on base 7 of coffee maker 1. He then shifts lever 50 to the folded position on upper face 34 of cover 32, which results in moving mobile jaw 40 against fixed jaw 46 to immobilize steam output nozzle tip 2 and create a watertight connection between steam output nozzle tip 2 and steam input conduit 70.

The user takes hold of gripping handle 86 of extremity 36 of distribution conduit 73 and assembles input housing 39 on protuberance 11 of coffee output nozzle 5. Magnet 37 and magnetic section 12 hold this assemblage together. The user may then place a receptacle on cup rest 6 and adjust the position of coffee output nozzle 5 and extremity 36.

The user then presses cappuccino distribution control button 9b, which triggers a hot frothed milk distribution cycle and a coffee distribution cycle. The heating element of coffee maker 1 is initially activated to generate a flow of steam which circulates through steam output nozzle tip 2 and steam input conduit 70 to enter frothing system 75. Mixing air and milk with steam creates the hot and frothed milk which passes through extremity 36 into the receptacle. When the programmed quantity of frothed milk is obtained, the coffee maker completes a distribution cycle for coffee which flows into the receptacle through nozzle coffee output 5. A cappuccino-type drink may therefore be prepared automatically after pressing control button 9b, without the user taking action.

The user may then remove extremity 36 from coffee output nozzle 5 and raise lever 50 from the opened position to disconnect device 30 from coffee maker 1.

Of course, the invention is not in any manner limited to the embodiment described and illustrated, which is only provided as an example. Other modifications are possible by, in particular, combining various items or substituting equivalent techniques, without, however, falling outside the protection of the invention.

In one embodiment, the mobile jaw is pulled back to the connected position by a spring. The mobile jaw contains an inclined partition on which the steam output nozzle tip acts when it is pressed by the fixed jaw to push the mobile jaw when the device is connected by a horizontal movement. When the steam output nozzle tip faces the upper opening of the mobile jaw receptacle, the spring pulls the mobile jaw into a connected position. The device contains a lever to move the mobile jaw from a connected position to a disconnected position.

The invention claimed is:

1. A milk-based drink production device designed to work with a steam output nozzle tip of a coffee maker, the milk-based drink production device comprising a steam input conduit and a connection system comprising at least one mobile jaw and fixed jaw in which the connection system is connected to the steam output nozzle tip wherein the at least one mobile jaw alternates between a connected position in which a watertight connection is formed between the steam output nozzle tip and the steam input conduit and in which the milk-based drink production device cannot be separated from the steam output nozzle tip, and a disconnected position in which the milk-based drink production device may be separated from the steam output nozzle tip, wherein the mobile jaw is formed from a receptacle having an upper opening and a lateral conduit that extends from the receptacle to the steam input conduit, wherein the steam output nozzle tip is inserted into the upper opening of the receptacle of the mobile jaw to connect the connection system to the coffee maker and, when making the connection to the coffee maker, the mobile jaw moves vertically against the fixed jaw that is positioned above the mobile jaw in a cover of the milk-based drink production device, and wherein the mobile jaw contains at least two trunnions, and the connection system further comprises a transfer piece that is mounted to rotate on the cover and which comprises at least two parallel, lateral partitions and at least two housings that match the trunnions formed on the mobile jaw.

2. The milk-based drink production device in accordance with claim 1, wherein the mobile jaw can be linearly displaced.

3. The milk-based drink production device in accordance with claim 1, wherein the connection system contains a means of manipulating the mobile jaw.

4. The milk-based drink production device in accordance with claim 3, wherein the means of manipulating for the mobile jaw includes a lever.

5. The milk-based drink production device in accordance with claim 4, wherein the milk-based drink production device contains a bottom on which the milk-based drink production device rests and wherein a force applied on the lever to displace the mobile jaw between the disconnected position and the connected position traverses the bottom.

6. The milk-based drink production device in accordance with claim 4, wherein the milk-based drink production device contains a reservoir for milk and a cover, with the connection system located on the cover.

7. The milk-based drink production device in accordance with claim 6, wherein the lever is positioned on an upper face of the cover and wherein the lever rotates between an opened position in which the mobile jaw is in the disconnected position and a folded position on the cover in which the mobile jaw is in the connected position.

8. The milk-based drink production device in accordance with claim 1, wherein the connection system contains a housing to accept a conical form designed to guide the steam output nozzle tip into the mobile jaw when making a connection.

9. The coffee maker with a milk-based drink production device in accordance with claim 1.

10. The coffee maker in accordance with claim 9, wherein the steam output nozzle tip is bent down.

11. The coffee maker in accordance with claim 10, wherein the milk-based drink production device moves horizontally toward the coffee maker to position the steam output nozzle tip between the fixed jaw and the mobile jaw.

12. The coffee maker in accordance with claim 9, wherein the steam output nozzle tip contains a watertight connection to create a watertight connection between the steam output nozzle tip and the steam input conduit.

\* \* \* \* \*

UNITED STATES PATENT AND TRADEMARK OFFICE
CERTIFICATE OF CORRECTION

PATENT NO. : 10,362,895 B2
APPLICATION NO. : 14/718884
DATED : July 30, 2019
INVENTOR(S) : Olivier Beaudet et al.

It is certified that error appears in the above-identified patent and that said Letters Patent is hereby corrected as shown below:

In the Claims

Column 8, Line 23, Claim 4, after "manipulating" delete "for"

Signed and Sealed this
First Day of October, 2019

Andrei Iancu
*Director of the United States Patent and Trademark Office*